UNITED STATES PATENT OFFICE.

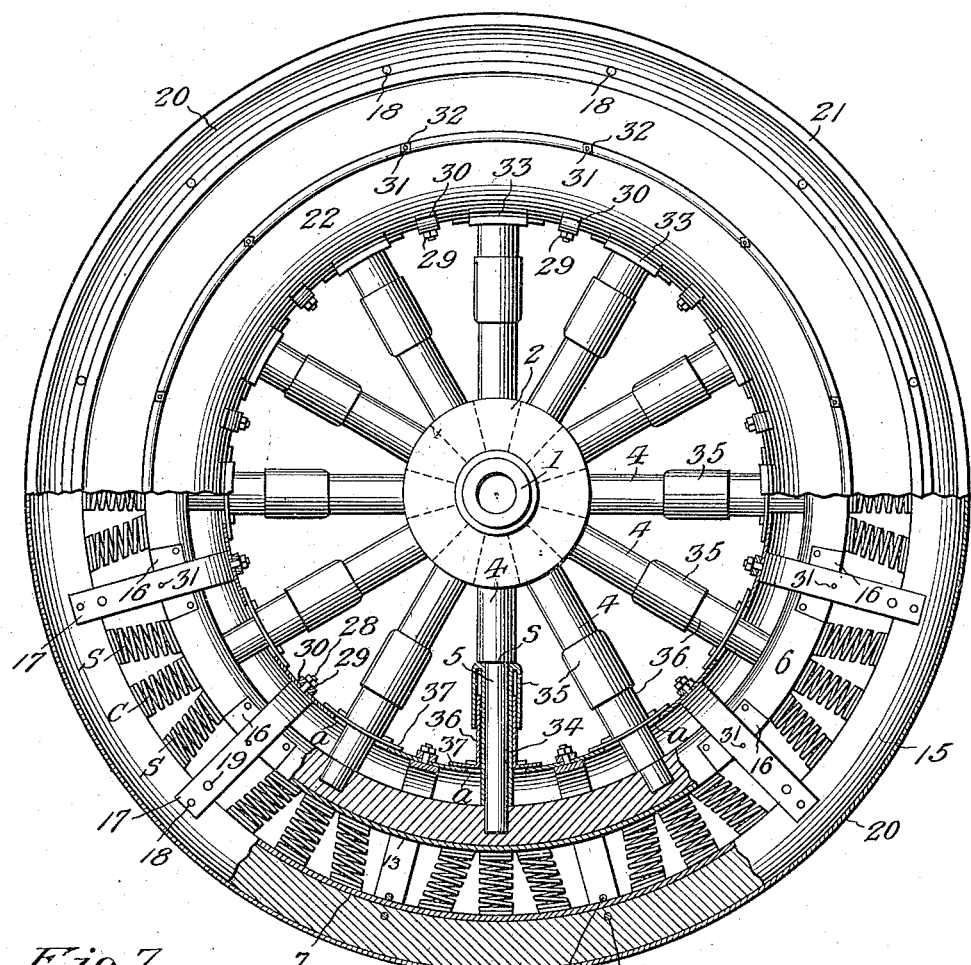

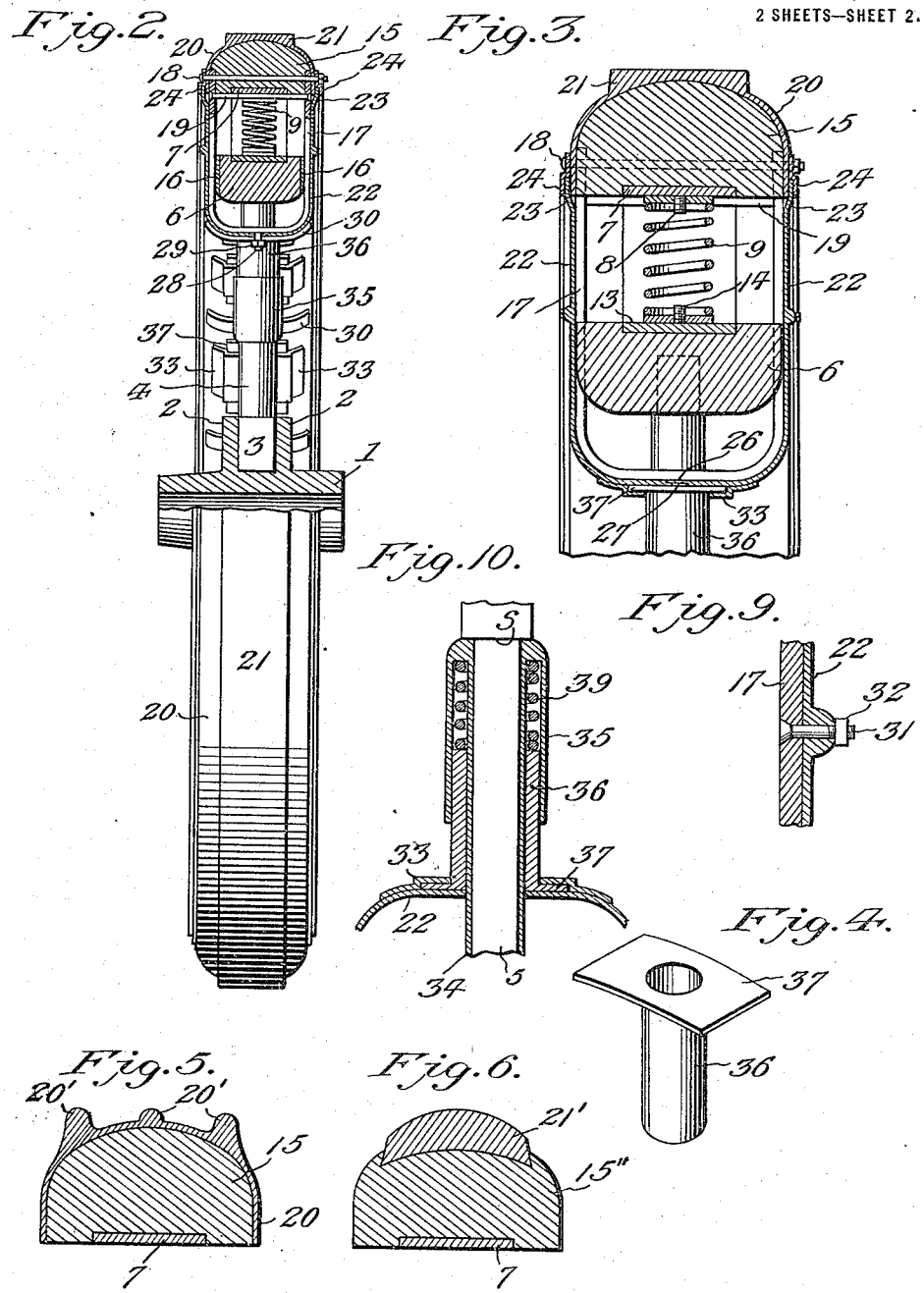

WILLIAM A. INGALLS, OF ARKANSAS CITY, KANSAS.

CUSHION-WHEEL.

1,224,747.   Specification of Letters Patent.   Patented May 1, 1917.

Application filed April 4, 1912. Serial No. 688,366.

*To all whom it may concern:*

Be it known that I, WILLIAM A. INGALLS, a citizen of the United States, and a resident of Arkansas City, in the county of Cowley and State of Kansas, have invented certain new and useful Improvements in Cushion-Wheels, of which the following is a specification, reference being had to the accompanying drawings.

This invention relates to certain new and useful improvements in cushion wheels.

My invention has for its object to improve the construction and operation of that class of wheels, especially adapted to be used in connection with automobiles, with the idea of providing a better and cheaper wheel than those at present in use. To this end my invention consists of a wheel having a tire yieldingly and elastically secured thereto, provided with a metallic tread capable of heavy wear and usage.

Another object is to provide a wheel having a tire with a system of shock absorbing springs inclosed within a metallic casing, the wheel being of a durable construction and of a simple and inexpensive nature, all the replaceable parts being readily accessible.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views:

Figure 1, shows a side elevation of a wheel with portions broken away embodying my invention.

Fig. 2, is an edge view with parts broken away.

Fig. 3, is an enlarged detached detail through the outer rim and felly.

Fig. 4, shows an enlarged detached detail of the collar.

Figs. 5 and 6, show a modification of the outer rim.

Fig. 7, shows an enlarged fragmentary view disclosing the method of arranging the springs as employed in my invention.

Fig. 8, is an enlarged detail of one of the springs.

Fig. 9, shows a fragmentary view disclosing the location of one of the pins employed in holding the shield to the yoke.

Fig. 10, shows a modification disclosing a method of securing the slide plate to the shield.

All those familiar with the operation of automobiles, know that the tire expense operates as a serious draw-back to the use of the machine, and many who could make use of the automobile, find themselves unable to do so in view of the heavy expenses attending the replacing of tires. In my present invention I provide a cushion wheel which will have practically all the resilience and elasticity of the pneumatic wheel, but is so constructed that the same cannot be punctured and will stand the heaviest wear.

In the accompanying drawings the numeral 1, designates the hub, 2, 2, the flanges between which the tenons 3, of the spokes 4, are held in the usual manner. As shown in Fig. 1, each spoke 4, has an extending reduced portion 5, the end of which is held within the felly 6. A shoulder $s$, is formed at the base of the forward portion 5, of the spoke, one of the shoulders being shown in Fig. 1.

Secured to the felly 6, is the preferably flat band 13, a broken portion being shown in Fig. 7. This band 13, is provided with a plurality of threaded studs 8, each stud being arranged to receive the butt 10, of a suitable coil spring 9, one of these springs being shown in Fig. 8. Each butt 10, has a threaded aperture 12, so that the springs may be screwed upon the studs 8.

Held concentric to the band 13, is the outer band 7, this outer band also being provided with a plurality of threaded studs 14. As shown in Fig. 7, the studs 8 and 14, are disposed in sets of three. The studs 14 however, are very much farther apart than are the studs 8, and are threaded in a direction opposite to the studs 8, so that the butts 11 and 10, can be simultaneously secured upon the studs 14 and 8.

The springs 9 are disposed in series, each set or series comprising three springs, a central spring which extends radially from the band 7, and two adjacent tangential springs. this construction being clearly disclosed in Fig. 1. The butts of the springs which are held in divergent spaced relation are held proximal to the inner butt of the central spring. To the outer band 7, is secured the outer rim 15. This rim may be of wood, papier mâché or of any other suitable material, and is covered by an outer casing 20.

The felly 6, as shown in Figs. 1 and 3, at predetermined points and upon opposite sides, is provided with suitable access openings within which are secured the rub plates 16, a number of these rub plates being clearly shown in Fig. 1. These rub plates are secured to the felly by means of suitable pins or bolts.

In order to prevent any lateral displacement of the felly 6, relative to the outer rim 15, I yoke and yieldingly secure the outer rim to the felly. This I accomplish in using a plurality of U-shaped yokes 17, which have their ends embedded within suitable seats within the outer rib 15, as shown in Fig. 1, and being secured thereto by means of the bolts 18. To further hold the yokes to the rim I provide the intermediately positioned brace bolts 19, each contacting with the outer rim 15.

Protecting the outer rim 15, is the outer band 20, this band preferably having a flat tread 21, this construction being shown in Fig. 2. As far as described I have an operative wheel. The springs are of such a tension that they will accommodate themselves to the maximum load likely to be carried by the vehicle to which they are secured.

In the use of the wheel however, mud would clog between the springs and between the bands, and in order to guard against this I provide a shield. In the drawings the shield comprises two members 22, which have their outer edges held below the flanges 24, as shown in Fig. 3, these flanges 24, in conjunction with the outer band forming a groove within which the edges of the shield are held. As shown at 26 and 27, in Fig. 3, the inner edges of the shield are rabbeted so that one rabbeted edge will fit upon the adjacent edge. These shields are further provided with suitable spoke receiving openings $a$, shown in Fig. 1, so that the spokes are permitted a movement relative to the casing which forms a part of the outer rim 15.

The shield members are secured to the outer rim 15 by means of the bolts 18, as shown in Fig. 1. As disclosed, the yokes 17, are each provided with a centrally extending threaded stud 28, these studs passing through suitable openings within the rabbeted edges of the shields as shown in Fig. 2. In order to hold the shield to the yokes I employ the clamps 30, which are held upon the studs 28, by means of the nuts 29. By this means the shields are securely clamped to the yokes.

In order to further assist in holding the shields to the yokes 17, side pins 31, may be employed. These pins are threaded and pass through suitable openings within the shields and yokes and held to the yokes by means of suitable nuts 32. This construction is shown in Fig. 9.

The access openings $a$, are closed by means of a slide plate 37, one of these plates being shown in detail in Fig. 4, and each of these plates is provided with a collar 36.

The collars 36, slide upon the ferrule 34, secured to the reduced spoke ends 5, as shown in Fig. 1. Each ferrule has a sleeve 35, and it is between the sleeves 35 and the ferrules that the collars 36, reciprocate. The slide plates 37, are held to the shields 22, by means of the guide flanges 33. By this means the plates 37, are slidably connected to the shields to cover the openings $a$. As shown in Fig. 1, the inner ends of the ferrules abut against the shoulders $s$. As shown in Fig. 5, the outer casing 20 is provided with a series of knobs 20' extending lengthwise of the tire to prevent slipping. In Fig. 6, the construction is modified by the insertion of a tread 21' in the rim 15.

From the foregoing it will be seen that I provide a wheel with a metal casing entirely inclosing the spring systems and all the working parts, preventing any dust or mud entering the casing.

In Fig. 10, I show a modification where I employ a spring 39, which is held below the collar 36. These springs 39, force the guide plates 37, upon the shields 22, and yieldingly hold the same thereupon. Where the springs are employed the guide flanges 33 may be dispensed with.

A wheel constructed according to my invention is simple and comparatively inexpensive and is both durable and efficient in operation while all the moving parts may be readily replaced in case of fracture.

Having thus described my said invention, what I claim as new and desire to secure by United States Letters Patent is:

1. The combination with a wheel and its felly, of an outer rim, the spokes of said wheel being cylindrical, a series of coil springs interposed between the felly of said wheel and said outer rim, a plurality of U-shaped yokes secured to said outer rim encompassing said felly, an annular shield having access openings to receive said spokes secured to said outer rim, a ferrule secured to the end of each spoke having a sleeve, a collar held upon each ferrule and outward of its sleeve, a slide plate connected to each collar, said slide plates closing said access openings, and flanges secured to said shield to slidably hold said plates.

2. The combination with a wheel, of an outer spaced rim, said wheel having cylindrical spokes, a series of springs interposed between the felly of said wheel and said outer rim, a plurality of U-shaped yokes secured to said outer rim and encompassing said felly, annular shields having access openings to receive said spokes, means to clamp said shields to said yokes, and slide plates upon said shields covering said access openings, each slide plate having a collar engaging a spoke.

3. A spring wheel comprising an outer rim, a series of cylindrical spokes, a felly spaced from the outer rim, a plurality of springs interposed between the felly and said rim, a plurality of U-shaped yokes secured to said outer rim and extending about said felly, annular shields having access openings to receive said spokes, means to clamp said shields to said yokes and slide plates upon said shields covering said access openings, each slide plate having a collar engaging one of the spokes.

4. A wheel of the type described, including a felly and an outer rim, of an inner band secured upon the outer periphery of the felly, an outer band secured upon the inner periphery of the rim, and a plurality of springs in series of three, the central spring of each series being radial and the lateral springs thereof converging toward the inner end of the central spring, said inner and outer bands having right-handed and left-handed screw-threaded studs, said springs having apertured butts, the apertures of said butts being arranged for engagement with said studs.

5. A wheel of the type described having spokes and a connected felly, of an outer rim resiliently connected to said felly, an outer casing having annular flanges covering said rim, an incasing sectional shield covering the resilient connection between said rim and felly the sections of said shield having their outer edges received under said flanges, the inner edges of said shield sections being rabbeted together and provided with spoke receiving openings, a spoke receiving ferrule secured to each spoke, and a sliding plate having a collar surrounding each ferrule said plates sliding over said spoke receiving openings.

6. A wheel of the type described having spokes and a connected felly, of an outer rim resiliently connected to said felly, an outer casing having annular flanges covering said rim, an incasing sectional shield covering the resilient connection between said rim and felly the sections of said shield having their outer edges received under said flanges, the inner edges of said shield sections being rabbeted together and provided with spoke receiving openings, a spoke receiving ferrule secured to each spoke, a sliding plate having a collar surrounding each ferrule said plates sliding over said spoke receiving openings, and a spring bearing at its ends against said collar and said ferrule.

7. A wheel of the type described having spokes and a connected felly, an outer rim resiliently connected to said felly, an inclosing sectional shield covering the resilient connection between said rim and felly having suitable spoke receiving openings, a sliding plate surrounding each spoke each plate having a collar, a ferrule surrounding each spoke and contained within a collar each ferrule having a sleeve encompassing a collar, means to secure said sliding plates to said shield, and a spring interposed between each collar and the end of a ferrule.

In testimony whereof I affix my signature, in presence of two witnesses.

WILLIAM A. INGALLS.

Witnesses:
 Louise C. Reilly,
 George W. Sues.

Copies of this patent may be obtained for five cents each, by addressing the "Commissioner of Patents, Washington, D. C."